United States Patent
Shah et al.

(10) Patent No.: US 6,981,383 B2
(45) Date of Patent: Jan. 3, 2006

(54) ZONE DAMPER FAULT DETECTION IN AN HVAC SYSTEM

(75) Inventors: Rajendra K. Shah, Indianapolis, IN (US); Christopher M. Puranen, Noblesville, IN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/841,281

(22) Filed: May 7, 2004

(65) Prior Publication Data

US 2005/0155365 A1   Jul. 21, 2005

Related U.S. Application Data

(60) Provisional application No. 60/537,693, filed on Jan. 20, 2004.

(51) Int. Cl.
*F25B 49/00*    (2006.01)
*F25D 17/04*    (2006.01)
*G05D 23/00*    (2006.01)

(52) U.S. Cl. .......................... 62/129; 62/131; 62/186; 165/11.2; 236/18; 236/49.3; 236/51; 236/94

(58) Field of Classification Search .................. 62/126, 62/129, 131, 186; 236/1 B, 49.3, 51, 94; 165/11.1, 11.2, 205
See application file for complete search history.

(56) References Cited

U.S. PATENT DOCUMENTS

| | | | | |
|---|---|---|---|---|
| 4,245,779 A | * | 1/1981 | Ardiente | 236/1 G |
| 4,530,395 A | * | 7/1985 | Parker et al. | 165/208 |
| 4,591,093 A | * | 5/1986 | Elliott, Jr. | 236/94 |
| 4,630,670 A | * | 12/1986 | Wellman et al. | 165/216 |
| 4,646,964 A | * | 3/1987 | Parker et al. | 236/49.3 |
| 5,251,815 A | * | 10/1993 | Foye | 236/49.3 |
| 5,271,558 A | * | 12/1993 | Hampton | 236/49.3 |
| 5,318,104 A | * | 6/1994 | Shah et al. | 165/208 |
| 5,495,887 A | * | 3/1996 | Kathnelson et al. | 165/11.1 |
| 6,223,544 B1 | * | 5/2001 | Seem | 62/127 |
| 2004/0194484 A1 | * | 10/2004 | Zou et al. | 62/186 |

* cited by examiner

*Primary Examiner*—Marc Norman
(74) *Attorney, Agent, or Firm*—Carlson, Gaskey & Olds

(57) ABSTRACT

A zoned HVAC system is provided with a series of dampers. A control for the dampers causes the dampers to each move between open and closed positions while monitoring a system condition. The system condition is selected to be one that should change as the damper moves between open and closed positions. If the system condition does not change as the control orders the damper to move between the open and closed positions, the particular damper is identified as a potentially faulty damper.

10 Claims, 1 Drawing Sheet

ZONE DAMPER FAULT DETECTION IN AN HVAC SYSTEM

This application claims priority to provisional patent application Ser. No. 60/537,693, filed Jan. 20, 2004, and entitled "Zone Damper Fault Detection in an HVAC System." The disclosure of this provisional application is incorporated herein in its entirety, by reference.

BACKGROUND OF THE INVENTION

This invention relates to a method and control for an HVAC system wherein there are multiple zones, each having a damper. The method and control enable a technician to determine the operating condition of the damper from a remote location.

In a typical ducted heating, ventilating and air conditioning (HVAC) system, a blower at an indoor air handler circulates treated air to various parts of the home through a system of ducts. In a zoned HVAC system, the ducts are divided into several zones, with one zone being associated with each part of the building that is desired to be controlled for comfort independently of the other areas. A set of dampers is installed into the duct segments, with at least one damper being associated with each zone.

Dampers can open or closed to direct more or less air to a particular zone as needed to satisfy a desired comfort level for that zone. In a more advanced system, dampers cannot only be fully open or fully closed, but they can be modulated to a number of intermediate positions to achieve a more precise level of comfort control.

Typically, a zoned HVAC system has an electronic control that sends signals to each damper to cause it to open or close. In a typical HVAC system, such as found in most residential systems, the dampers operate "open loop" or without any feedback to the electronic control regarding a current position. In addition, if there is a fault at a damper, feedback is not provided to the electronic control. Thus, the electronic controls do not have knowledge of the fault. Thus, a control cannot easily determine when the system is not operating properly.

Damper faults can be due to an installation error such as a mis-wiring, a fault in the damper motor, a mechanical blockage that prevents damper movement, etc. During installation or service of the zoned system, it is difficult and time-consuming for a technician to pinpoint the nature of any fault and the zone that is affected.

SUMMARY OF THE INVENTION

This invention discloses a method and control that enables the identification of a faulty damper in a zoned HVAC system. The method runs automatically from the control. Further, the control can identify which zone has the faulty damper, and can provide certain information with regard to the nature of the damper fault. This information is provided to a technician at the control to ensure quick and accurate installation or service.

The disclosed embodiment determines the damper condition by looking at changing characteristics at the air handler, as each damper is moved between open and closed positions.

These and other features of the present invention can be best understood from the following specification and drawing, the following of which is a brief description.

DETAILED DESCRIPTION OF THE PREFERRED EMBODIMENT

Figure 1:
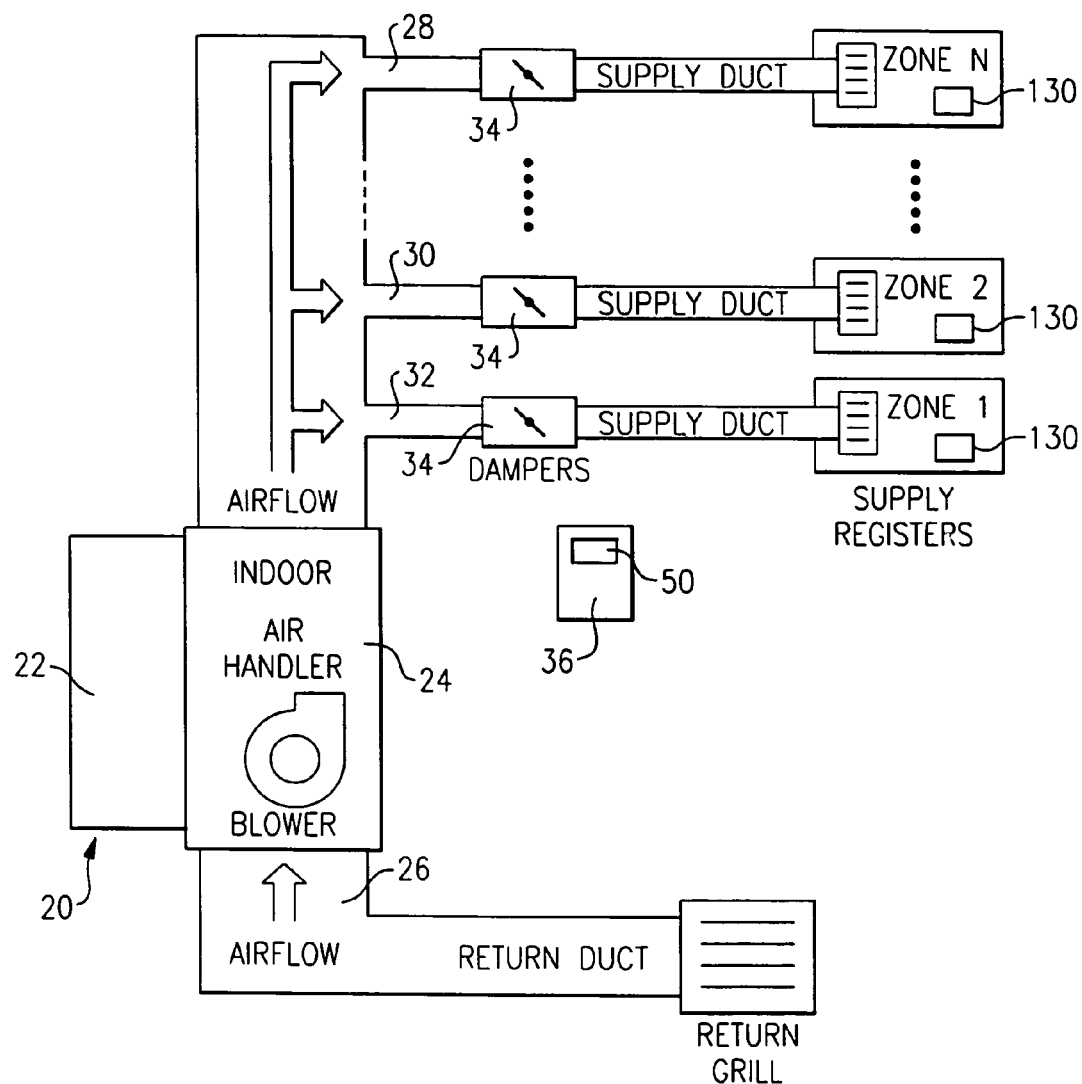
FIG. 1 is a schematic of an inventive HVAC system.

A multi-zone HVAC system is shown schematically at 20 in FIG. 1. An indoor unit (furnace/heater coil) and/or an outdoor unit (air conditioning/heat pump) (collectively, temperature conditioning component 22) is associated with an indoor air handler 24. Air handler 24 takes air from return ducts 26 and drives the air into a plurality of ducts 28, 30, and 32 associated with distinct zones 1, 2, and 3 in a building. As shown, a damper 34 is provided on each of the zone ducts 28, 30 and 32. A system control, such as a microprocessor control 36 controls the dampers 34, the indoor air handler 24, temperature conditioning component 22, and also communicates with user zone controls 130 associated with each of the zones. The controls 130 can essentially be thermostats allowing a user to set desired temperature, noise levels, etc. for each of the zones relative to the others. Moreover, the controls 130 preferably include a temperature sensor for providing an actual temperature back to the control 36.

In one embodiment, the control system 36 is mounted within one of the thermostat controls 30, and communicates as a system control with all of the other elements through control wiring schemes such as is disclosed in co-pending U.S. patent application Ser. No. 10/752,626, entitled "Serial Communicating HVAC System" and filed on Jan. 7, 2004. System control 36 is also preferably able to receive configuring information with regard to each of these elements such that the control 36 understands individual characteristics of the elements 22, 24, 30 and 34. Details of this feature may be as disclosed in co-pending U.S. patent application Ser. No. 10/752,628, filed on Jan. 7, 2004 and entitled "Self-Configuring Controls for Heating, Ventilating and Air Conditioning Systems." The disclosure of these two applications is incorporated herein by reference.

Indoor air handler 24 has a variable speed blower motor that is capable of reporting its operating speed to system control 36. In such a system, the blower motor speed increases when the restriction in the duct increases, as happens due to the closing of a damper 34.

In the disclosed implementation of this idea, system control 36 operates the indoor blower at a predetermined level, which could be an airflow level or a motor torque level. Control 36 then opens and closes, in sequence, the damper 34 associated with a particular zone while recording the speed from the blower motor. The other zone dampers are not moved during this sequence.

If the blower speed with a damper 34 closed is greater than the speed with the damper 34 open, the damper is operating properly. If the speeds for the open and closed damper are the same (or within measurement tolerances), the damper 34 is determined to be "not responding." This defines a fault. If the speed for the closed damper is less than when it is open, the damper is "reversed" or mis-wired. Thus, not just a fault is identified, but sometimes also the nature of the fault.

This sequence is then repeated for every zone in the system. In this manner, the system can automatically determine if all dampers are functioning correctly, and identify the particular damper that is either not responding or is reversed.

The entire fault determination process may be conducted during the initial installation of the system and any resulting faults may be indicated to the installer. For example, a non-responding damper may be due to a loose wire, a faulty damper motor or a mechanical restriction to damper movement. A reversed damper would typically be due to the open and close signal wires being mis-wired. All of these, once identified, can be easily corrected.

As shown, control 36 may be incorporated with a display panel 50. Display panel 50 may identify the particular damper 34 that has been identified as faulty, or a series of faulty dampers. Also, the nature of the fault may be identified. In a disclosed embodiment, the control 36 is incorporated into a thermostat, and operates as described above as a system control.

Further, the fault determination process can be conducted periodically after the system is in operation. In the event a fault is detected, the system can alert the homeowner, provide the fault details to a service technician and confirm when the problem is corrected.

In a second embodiment, the indoor blower is also capable of maintaining the airflow through the duct system substantially constant, independent of the overall restriction in the ducts including any partially or fully closed dampers 34. Further, the control 36 is capable of computing the duct static pressure based on the operating airflow, the operating blower motor speed and certain predetermined characteristics of the air handler unit, per an algorithm which is disclosed in co-pending U.S. patent application Ser. No. 10/426,463, filed Apr. 30, 2003 and entitled "Method of Determining Static Pressure in a Ducted Air Delivery System Using a Variable Speed Motor." The entire disclosure of this application is incorporated herein by reference. Like the blower speed, duct static pressure increases when a damper is closed. The duct static pressure may be a more accurate measure of the duct restriction than the blower speed, by itself. Therefore, with this embodiment, duct static pressure is substituted for blower speed in the above damper fault detection method.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of determining the condition of a damper from a remote location comprising the steps of:
   (1) providing a zoned HVAC system including a plurality of zone ducts each including a damper and providing a single control for operating each of said plurality of dampers;
   (2) utilizing said control to drive at least one of said dampers between an open and closed position, and leaving at least one other of said plurality of dampers at an initial position, and monitoring a system condition during said movement of said at least one of said dampers; and
   (3) identifying a damper fault if said system condition does not change as expected as said at least one of said dampers moves between said open and closed positions.

2. A method of determining the condition of a damper from a remote location comprising the steps of:
   (1) providing a zoned HVAC system including a plurality of zone ducts each including a damper and providing a control for operating each of said dampers;
   (2) utilizing said control to drive at least one of said dampers between an open and closed position, and monitoring a system condition during said movement of said damper;
   (3) identifying a damper fault if said system condition does not change as expected as said damper moves between said open and closed positions; and
   said monitored system condition is a blower speed.

3. A method of determining the condition of a damper from a remote location comprising the steps of:
   (1) providing a zoned HVAC system including a plurality of zone ducts each including a damper and providing a control for operating each of said dampers;
   (2) utilizing said control to drive at least one of said dampers between an open and closed position, and monitoring a system condition during said movement of said damper;
   (3) identifying a damper fault if said system condition does not change as expected as said damper moves between said open and closed positions; and
   the type of damper fault is also identified in step (3).

4. The method as set forth in claim 3, wherein the type of damper fault is identified as a faulty damper if said system condition does not change within an appreciable tolerance as the damper moves between the open and closed positions.

5. The method of claim 3, wherein the type of damper fault is identified as a system mis-wiring if the system condition changes in an opposed direction than as would be expected as the damper moves between open and closed positions.

6. An HVAC system comprising:
   an indoor air handler for delivering air to a series of ducts;
   a series of dampers associated with a series of ducts; and
   a single control for controlling said series of dampers, said single control being capable of causing each of said dampers to move between an open and closed position, while leaving at least one other of said series of dampers at an initial position, and to monitor a system condition during said movement, said control identifying a fault at a particular one of said dampers that is moving between said open and closed position, if said monitored system condition does not change as expected during movement of said damper.

7. An HVAC system comprising:
   an indoor air handler for delivering air to a series of ducts;
   a series of dampers associated with a series of ducts;
   a control for controlling said dampers, said control being capable of causing each of said dampers to move between an open and closed position, and to monitor a system condition during said movement, said control identifying a fault at a particular one of said dampers that is moving between said open and closed position, if said monitored system condition does not change as expected during movement of said dampers: and
   said monitored system condition is a blower speed.

8. An HVAC system comprising:
   an indoor air handler for delivering air to a series of ducts;
   a series of dampers associated with a series of ducts;
   a control for controlling said dampers, said control being capable of causing each of said dampers to move between an open and closed position, and to monitor a system condition during said movement, said control identifying a fault at a particular one of said dampers that is moving between said open and closed position, if said monitored system condition does not change as expected during movement of said damper; and
   a type of damper fault is also identified.

9. The system as set forth in claim 8, wherein the type of damper fault is identified as a faulty damper if said system condition does not change within an appreciable tolerance as the damper moves between the open and closed positions.

10. The system of claim 8, wherein the type of damper fault is identified as a system mis-wiring if the system condition changes in an opposed direction than as would be expected as the damper moves between open and closed positions.

* * * * *